United States Patent
Kimura et al.

(10) Patent No.: US 11,239,474 B2
(45) Date of Patent: Feb. 1, 2022

(54) METHOD FOR PRODUCING CATALYST FOR FUEL CELLS, AND FUEL CELL CONTAINING CATALYST FOR FUEL CELLS PRODUCED BY THE PRODUCTION METHOD

(71) Applicants: TOYOTA JIDOSHA KABUSHIKI KAISHA, Toyota (JP); AUDI AG, Ingolstadt (DE)

(72) Inventors: Hiroko Kimura, Susono (JP); Naoki Takehiro, Sunto-gun (JP)

(73) Assignees: TOYOTA JIDOSHA KABUSHIKI KAISHA, Toyota (JP); AUDI AG, Ingolstadt (DE)

( * ) Notice: Subject to any disclaimer, the term of this patent is extended or adjusted under 35 U.S.C. 154(b) by 315 days.

(21) Appl. No.: 14/400,661

(22) PCT Filed: Jan. 21, 2013

(86) PCT No.: PCT/JP2013/051083
§ 371 (c)(1),
(2) Date: Nov. 12, 2014

(87) PCT Pub. No.: WO2013/172050
PCT Pub. Date: Nov. 21, 2013

(65) Prior Publication Data
US 2015/0093682 A1    Apr. 2, 2015

(30) Foreign Application Priority Data
May 15, 2012    (JP) .............................. JP2012-111402

(51) Int. Cl.
*H01M 4/00*     (2006.01)
*H01M 4/92*     (2006.01)
(Continued)

(52) U.S. Cl.
CPC ............. *H01M 4/926* (2013.01); *H01M 4/86* (2013.01); *H01M 4/88* (2013.01); *H01M 4/8817* (2013.01);
(Continued)

(58) Field of Classification Search
CPC .......... H01M 4/926; H01M 4/86; H01M 4/88; H01M 4/92; H01M 4/921; H01M 4/8817; H01M 4/1018; H01M 4/8825
See application file for complete search history.

(56) References Cited

U.S. PATENT DOCUMENTS 6,103,393 A *  8/2000  Kodas ...................... B01J 13/02
                                                    257/E23.075
6,187,468 B1 * 2/2001  Shinkai ............... H01M 4/8605
                                                        29/623.5
(Continued)

FOREIGN PATENT DOCUMENTS

EP          1524711 A2      4/2005
JP         60133662 A  *   7/1985  .......... H01M 4/8835
(Continued)

OTHER PUBLICATIONS

English Translation of JP2011-218278.*
(Continued)

*Primary Examiner* — Milton I Cano
*Assistant Examiner* — Mary G Henshaw
(74) *Attorney, Agent, or Firm* — Hunton Andrews Kurth LLP

(57) ABSTRACT

The present invention is to provide a method for producing a catalyst for fuel cells with excellent durability, and a fuel cell comprising a catalyst for fuel cells produced by the production method. Disclosed is a method for producing a catalyst for fuel cells, the catalyst comprising fine catalyst particles, each of which comprises a palladium-containing (Continued)

core particle and a platinum-containing outermost layer covering the core particle, and carbon supports on which the fine catalyst particles are supported, wherein the method comprises the steps of: preparing carbon supports on which palladium-containing particles are supported; fining the carbon supports; and covering the palladium-containing particles with a platinum-containing outermost layer after the fining step.

17 Claims, 6 Drawing Sheets

(51) Int. Cl.
 H01M 4/86 (2006.01)
 H01M 4/88 (2006.01)
 H01M 8/1018 (2016.01)
(52) U.S. Cl.
 CPC ........... H01M 4/8825 (2013.01); H01M 4/92 (2013.01); H01M 4/921 (2013.01); H01M 8/1018 (2013.01); H01M 2008/1095 (2013.01)

(56) References Cited

U.S. PATENT DOCUMENTS

| | | | | |
|---|---|---|---|---|
| 2003/0013606 A1* | 1/2003 | Hampden-Smith | ........ | B01J 2/02 502/180 |
| 2003/0232235 A1* | 12/2003 | Gorer | .................. | H01M 4/8605 429/524 |
| 2004/0038808 A1* | 2/2004 | Hampden-Smith | ...... | B01J 21/18 502/180 |
| 2007/0031722 A1* | 2/2007 | Adzic | ................. | H01M 4/8657 429/424 |
| 2010/0003571 A1* | 1/2010 | Morinaga | ........... | H01M 4/8885 429/534 |
| 2010/0035124 A1* | 2/2010 | Thompson | .......... | H01M 4/8673 429/437 |
| 2010/0062929 A1* | 3/2010 | Virkar | ...................... | B01J 23/40 502/304 |
| 2011/0155579 A1* | 6/2011 | Wang | ....................... | B01J 21/18 205/103 |
| 2012/0010069 A1 | 1/2012 | Takehiro et al. | | |

FOREIGN PATENT DOCUMENTS

| | | | | |
|---|---|---|---|---|
| JP | 2008-147007 A | | 6/2008 | |
| JP | 2009-245932 A | | 10/2009 | |
| JP | 2011-212666 A | | 10/2011 | |
| JP | 2011-218278 | * | 11/2011 | ............. H01M 4/88 |
| JP | 2011-218278 A | | 11/2011 | |
| JP | 2012-016684 A | | 1/2012 | |
| JP | 2012-074347 A | | 4/2012 | |
| WO | 2008025750 A1 | | 3/2008 | |

OTHER PUBLICATIONS

Machine translation of JPS60133662A (Year: 1985).*
J. Zhang et al; "Platinum Monolayer Electrocatalysts for O2 Reduction: Pt Monolayer on Pd (111) and on Carbon-Supported Pd Nanoparticles," J. Phys. Chem B, vol. 108, Jun. 22, 2004, pp. 10955-10964, XP002741687, DOI: 10.1021/jp0379953.
Jin Ho Bang et al.; "Porous Carbon Supports Prepared by Ultrasonic Spray Pyrolysis for Direct Methano Fuel Cell Electrodes," J. Phys. Chem. C, vol. 111, Jun. 30, 2007, pp. 10959-10964, XP002741688, DOI: 10. 1021/jp071624v.
Suddhasatwa Basu; "Recent Trends in fuel cell science and technology," Dec. 31, 2007, Springer, New Delhi, India, XP002741689, ISBN: 0-387-35537-5, pp. 191-191.

* cited by examiner

METHOD FOR PRODUCING CATALYST FOR FUEL CELLS, AND FUEL CELL CONTAINING CATALYST FOR FUEL CELLS PRODUCED BY THE PRODUCTION METHOD

CROSS-REFERENCE TO RELATED APPLICATIONS

This is a national phase application based on the PCT International Patent Application No. PCT/JP2013/051083 filed Jan. 21, 2013, claiming priority to Japanese Patent Application No. 2012-111402 filed May 15, 2012, the entire contents of both of which are incorporated herein by reference.

TECHNICAL FIELD

The present invention relates to a method for producing a catalyst for fuel cells, which has excellent durability, and a fuel cell containing a catalyst for fuel cells produced by the production method.

BACKGROUND ART

In fuel cells, a fuel and an oxidant are supplied to two electrically-connected electrodes to electrochemically oxidize the fuel, thereby converting chemical energy directly to electrical energy. Unlike thermal power generation, fuel cells are not limited by the Carnot cycle; therefore, they show high energy conversion efficiency. A fuel cell generally comprise a stack of fuel cells, each having an electrolyte layer sandwiched by a pair of electrodes, that is, a membrane-electrode assembly as the basic structure.

Supported platinum and platinum alloy materials have been used in anode and cathode electrode catalysts of fuel cells. However, platinum in an amount that is required to produce the current electrode catalysts is still too expensive to realize commercial mass production of fuel cells. Therefore, research has been conducted on the reduction of the amount of platinum contained in the cathode and anode of fuel cells by combining platinum with inexpensive metal.

One of the studies of combination of platinum with inexpensive metal is a study of deposition of a platinum monatomic layer on gold particles. A technique using this study is disclosed in Patent Literature 1, which is a method for producing a platinum core-shell catalyst and in which platinum is directly deposited on gold particles by immersing the gold particles in a solution containing a divalent or tetravalent platinum ion, without the presence of a reducing agent.

CITATION LIST

Patent Literature 1: Japanese Patent Application Laid-Open No. 2011-212666

SUMMARY OF INVENTION

Technical Problem

In paragraph [0022] of the Specification of Patent Literature 1, it is described that platinum core-shell catalyst particles supported on carbon supports (Pt/Au/C) are uniformly dispersed and supported on a rotating disk electrode. However, as a result of research, the inventors of the present invention have found that in the case of using fine catalyst particles having a core-shell structure to produce electrodes, the core-shell structure of the particles may be damaged when the particles are dispersed by a strong force.

The present invention was achieved in light of the above circumstance. An object of the present invention is to provide a method for producing a catalyst for fuel cells, which has excellent durability, and a fuel cell containing a catalyst for fuel cells produced by the production method.

Solution to Problem

The method for producing a catalyst for fuel cells according to the present invention, is a method for producing a catalyst for fuel cell, the catalyst comprising fine catalyst particles, each of which comprises a palladium-containing core particle and a platinum-containing outermost layer covering the core particle, and carbon supports on which the fine catalyst particles are supported, wherein the method comprises the steps of: preparing carbon supports on which palladium-containing particles are supported; fining the carbon supports; and covering the palladium-containing particles with a platinum-containing outermost layer after the fining step.

In the present invention, it is preferable that after the fining step, a median diameter $x_{50}$ in the cumulative distribution on a volumetric basis of the carbon supports is 1 to 20 µm.

In the present invention, in the preparation step, the median diameter $x_{50}$ in the cumulative distribution on a volumetric basis of the carbon supports can be more than 20 µm.

In the present invention, it is preferable that after the fining step, a mean volume diameter of the carbon supports is 1 to 20 µm.

In the present invention, it is preferable that after the fining step, a standard deviation σ in the particle size distribution of the carbon supports is 1 to 5 µm.

In the present invention, it is preferable that after the fining step, a 90% diameter $x_{90}$ in the cumulative distribution on a volumetric basis of the carbon supports is 10 to 30 µm.

In the present invention, it is preferable that after the fining step, a mean number diameter of the carbon supports is 1 to 10 µm.

In the present invention, it is preferable that after the fining step, a mean area diameter of the carbon supports is 1 to 10 µm.

In the present invention, it is preferable that after the fining step, the particle size distribution of the carbon supports is an approximately normal distribution.

In the present invention, the fining step can be a step of fining the carbon supports by at least one stirring device selected from the group consisting of a homogenizer, a bead mill, a shear mixer, a roll mill and a bottle-on roll mill.

In the present invention, it is preferable that the outermost layer covering step comprises at least the steps of: covering the palladium-containing particles with a monatomic layer, and replacing the monatomic layer with the platinum-containing outermost layer.

The fuel cell of the present invention comprises a unit cell that contains a membrane electrode assembly comprising a polyelectrolyte membrane, an anode electrode on one surface of the membrane, the anode electrode containing at least an anode catalyst layer, and a cathode electrode on the other surface of the membrane, the cathode electrode containing at least a cathode catalyst layer, wherein at least one of the anode and cathode catalyst layers contains the catalyst for fuel cells produced by the above-described production method.

Advantageous Effects of Invention

According to the present invention, the carbon supports on which palladium-containing particles are supported are fined in advance, which serve as a raw material for the catalyst for fuel cells. Therefore, in the case of using the catalyst to produce fuel cell electrodes, the catalyst can be successfully dispersed in electrodes, even if the catalyst is dispersed under a milder condition than ever before. As a result, the structure in which the palladium-containing particles are covered with the outermost layer, i.e., the core-shell structure, can be prevented from being broken, and a catalyst for fuel cells with excellent durability can be produced, therefore.

DESCRIPTION OF EMBODIMENTS

Figure 1:
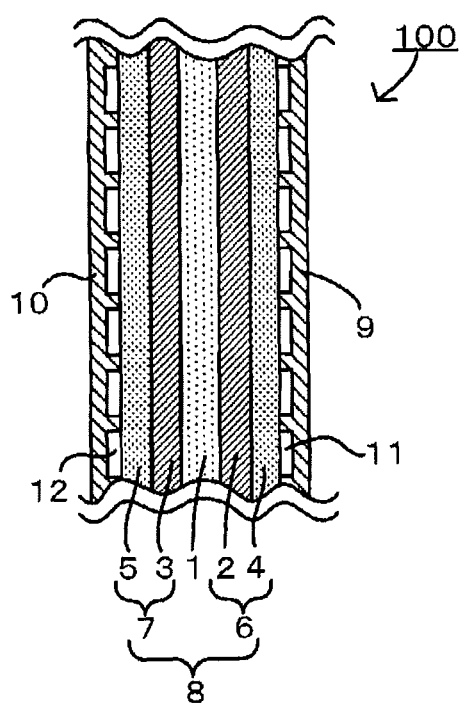
FIG. 1 is a view showing an example of the unit fuel cell used in the present invention, and it is also a schematic sectional view along the laminating direction.

1. Method for Producing a Catalyst for Fuel Cells

The catalyst production method of the present invention is a method for producing a catalyst for fuel cells, the catalyst comprising fine catalyst particles, each of which comprises a palladium-containing core particle and a platinum-containing outermost layer covering the core particle, and carbon supports on which the fine catalyst particles are supported, wherein the method comprises the steps of: preparing carbon supports on which palladium-containing particles are supported; fining the carbon supports; and covering the palladium-containing particles with a platinum-containing outermost layer after the fining step.

When a catalyst for fuel cells is used to produce an electrocatalyst layer of a fuel cell, it is common to first disperse the catalyst in a given solvent to produce an ink and then apply the ink to a fuel cell member such as a solid electrolyte membrane, followed by drying, thus forming the electrocatalyst layer. From the viewpoint of increasing fuel cell power generation efficiency, it is important to form an infinite number of triple phase interfaces in the electrocatalyst layer, in each of which the catalyst for fuel cells, a fuel or oxidant gas supplied, and the electrolyte are in contact. Therefore, when forming the electrocatalyst layer, it is needed to sufficiently disperse the catalyst for fuel cells in the solvent so that the catalyst is in a well-dispersed state and then to apply the dispersed catalyst to the surface of a solid electrolyte membrane, etc. Accordingly, to put the catalyst for fuel cells into a well-dispersed state in the solvent, it is needed to use a dispersion method with a relatively severe condition when forming the ink.

However, when the catalyst for fuel cells is dispersed in the solvent under a relatively severe condition, the core-shell structure of the fine catalyst particles may be broken in the case of being dispersed for a relatively long dispersion time or being dispersed by a relatively strong shear force, for example. In the present invention, the fine catalyst particles preferably have such a structure that the surface of the palladium-containing particles is covered with the outermost layer which is an ultrathin layer composed of about one or two atomic layers. To disperse the catalyst for fuel cells in the solvent, a homogenizer, bead mill or the like is generally used. However, by the shear force applied to the fine catalyst particles at the time of dispersion, such an ultrathin layer may be broken and thus the palladium-containing particles may appear on the surface of the fine catalyst particles. In the catalyst for fuel cells with such a broken outermost layer, palladium on the surface may be dissolved when the fuel cell is in operation: therefore, the durability of the catalyst for fuel cells may be decreased. Also, palladium ions of the dissolved palladium involve the catalytic components such as platinum and may cause a decrease in fuel cell performance. Therefore, in the case of using the fine catalyst particles with a core-shell structure to prepare the ink for electrocatalyst layers, there is a natural limit to the condition of dispersing the catalyst for fuel cells in the solvent.

On the other hand, when the condition of dispersing the catalyst for fuel cells in the solvent is too mild, the catalyst is not sufficiently dispersed in the solvent in the case of being dispersed for a relatively short dispersion time or being dispersed by a relatively weak sear force, for example. As a result, in the electrocatalyst layer thus formed, the particles of the catalyst for fuel cells may be aggregated and may result in insufficient catalytic performance. This tendency is remarkable especially in the case of using carbon, which is likely to aggregate, as carbon support.

The inventors of the present invention have found out the following and achieved the present invention: in the production of the fine catalyst particles containing the palladium-containing particles and the outermost layer, by fining the carbon supports on which the palladium-containing particles are supported before covering the palladium-containing particles with the outermost layer and thereby loosening carbon supports in advance, the catalyst for fuel cells can be put in a well-dispersion state in the solvent even when the catalyst is dispersed under a relatively mild condition at the time of forming the electrocatalyst layer. As just described, by dispersing the catalyst for fuel cells in the solvent under a relatively mild condition, the fine catalyst particles can be prevented from being broken by the shear force applied upon dispersion.

The present invention comprises the steps of: (1) preparing carbon supports on which palladium-containing particles are supported; (2) fining the carbon supports on which the palladium-containing particles are supported; and (3) covering the palladium-containing particles with a platinum-containing outermost layer. The present invention is not limited to the three steps and can include, for example, the following steps as described below: a pretreatment step, a filtering step, a washing step, a drying step and a grinding step.

Hereinafter, the steps (1) to (3) and other steps will be described in order.

1-1. The Step of Preparing Carbon Supports on which Palladium-Containing Particles are Supported The carbon supports on which the palladium-containing particles are supported, which serve as a raw material for the catalyst for fuel cells, are not particularly limited, as long as they are carbon supports on which palladium-containing metal particles are supported. The carbon supports on which the palladium-containing particles are supported used in the present invention, can be carbon supports prepared in advance or can be a commercially-available product.

The palladium-containing particles used in the present invention preferably contains a metal material which does not cause a lattice mismatch with the below-described raw materials used in the outermost layer. From the viewpoint of reducing costs, it is preferable that the palladium-containing particles contain a cheaper metal material than the raw materials used in the outermost layer. It is more preferable that the palladium-containing particles contain a metal material which is able to conduct electrical current.

From this viewpoint, the palladium-containing particles used in the present invention are preferably palladium particles or alloy particles made of palladium and a metal such as iridium, rhodium or gold. In the case of using palladium alloy particles, only one kind of metal can be contained in the particles in combination with palladium, or two or more kinds of metals can be contained in the particles in combination with palladium.

The average particle diameter of the palladium-containing particles is not particularly limited, as long as it is equal to or less than the average particle diameter of the fine catalyst particles described below. The average particle diameter of the palladium-containing particles is preferably 30 nm or less, more preferably 5 to 10 nm, from the point of view that the ratio of the surface area per palladium-containing particle to the cost per palladium-containing particle, is high.

The average particle diameter of the palladium-containing particles and fine catalyst particles used in the present invention is calculated by an ordinary method. An example of the calculation method is as follows. First, a particle is picked up from particles shown in a transmission electron microscope (TEM) image at a magnification of 400,000× to 1,000,000×. Then, assuming that the particle is a sphere particle, the particle diameter is calculated. Such a particle diameter calculation by the TEM observation is carried out on 200 to 300 particles of the same type, and the average of the particles is used as the average particle diameter.

The carbon supports used in the present invention are not particularly limited, as long as they are carbon supports that are generally used in fuel cell electrodes. Examples thereof include electroconductive carbonaceous materials including carbon fiber and carbon particles such as Ketjen Black (product name; manufactured by Ketjen Black International Company), Vulcan (product name; manufactured by Cabot Corporation), Norit (product name; manufactured by Norit Activated Carbon), black pearls (product name; manufactured by Cabot Corporation) and Acetylene Black (product name; manufactured by Chevron).

Figure 7:
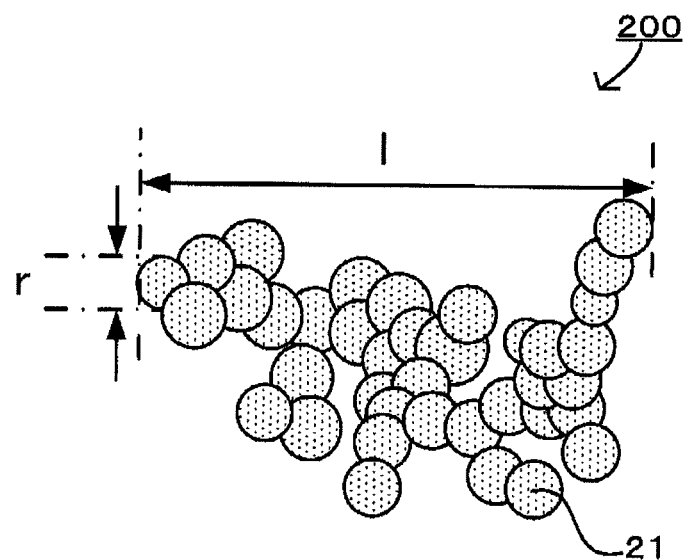
FIG. 7 is a schematic perspective view of an example of a carbon support used in the present invention.

FIG. 7 is a schematic perspective view of an example of a carbon support used in the present invention. The carbon supports used in the present invention are not limited to the example shown in FIG. 7.

As shown in FIG. 7, a carbon support 200 has a structure in which approximately spherical carbon particles 21 are linked together. In general, with respect to the particle diameter r of each carbon particle 21, the length l of the minimum unit of the linked carbon particles 21 is referred to as "structure". The structure l of the carbon support used in the present invention is generally 0.01 to 1.0 μm.

Figure 12:
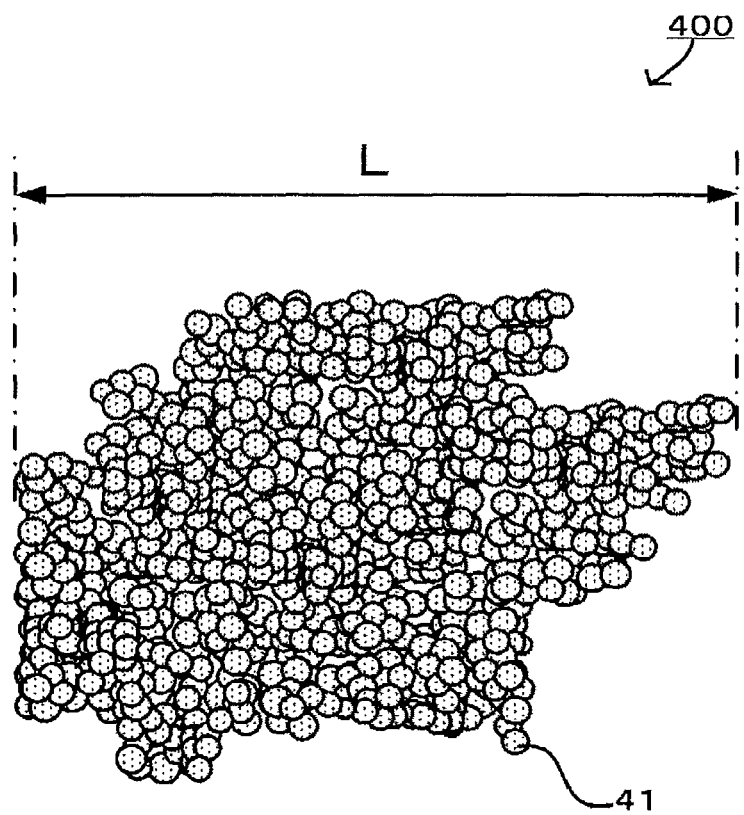
FIG. 12 is a schematic perspective view of an example of a commercially-available carbon support.

FIG. 12 is a schematic perspective view of an example of a commercially-available carbon support. In general, commercially-available carbon supports have a structure like a carbon aggregate 400 shown in FIG. 12. Carbon particles 41 shown in FIG. 12 correspond to the carbon particles 21 shown in FIG. 7. That is, one composed of the minimum units of the linked carbon particles 21 shown in FIG. 7, the units being tangled together, is the carbon aggregate 400 shown in FIG. 12.

The diameter L of the carbon aggregates ranges from about 0.1 μm at a minimum to about hundreds of micrometers (μm) at a maximum. In commercially-available carbon supports, carbon aggregates of such various sizes are contained.

When the palladium-containing particles are supported as they are on such commercially-available carbon supports and then covered with the outermost layer, the median diameter $x_{50}$ in the cumulative distribution on a volumetric basis of the thus-obtained aggregates is more than 100 μm. In the case of using such commercially-available carbon supports, to obtain the catalyst for fuel cells which has a predetermined average particle diameter and particle size distribution, it is needed to fine the catalyst under a relatively severe condition. However, there is such a problem that the structure of the fine catalyst particles is broken by fining the catalyst under such a severe condition.

In the present invention, the tangled carbon aggregate is loosen by use of a fining method as described below, such as a direct homogenizer method in which a vibrator is directly put in a container containing a dispersing object to disperse the object, an indirect homogenizer method in which vibration is applied to a container containing a dispersing object from the outside of the container to disperse the object, or an ultrasonic homogenizer, thereby bringing the diameter L of the carbon aggregate to the structure l of the carbon support. In the present invention, the particle diameter of the carbon supports on which the palladium-containing particles are supported means the diameter of the carbon aggregate after being loosened, preferably the structure l of the carbon support that appears after the aggregate is absolutely loosened. As described above, the particle diameter of the palladium-containing particles is as small as tens of nanometers or less, so that it is not needed to consider the particle diameter of the palladium-containing particles, when weighing the particle diameter of the carbon supports on which the palladium-containing particles are supported.

Since the approximately spherical carbon particles 21 as shown in FIG. 7 are bound by carbon-carbon covalent bonding, it is unlikely that the shape of the structure is broken by the fining carried out in the present invention. That is, the fining carried out in the present invention is just a process to loosen the tangled carbon aggregate.

The method for supporting the palladium-containing particles on the carbon supports can be a conventionally-used method. In the case of using palladium alloy particles, preparation of a palladium alloy can be carried out at the same time as supporting the palladium alloy particles on the carbon supports.

In this step, the median diameter $x_{50}$ in the cumulative distribution on a volumetric basis of the carbon supports on which palladium-containing particles are supported, can be more than 20 μm. In the fining step described below, the median diameter $x_{50}$ can be reduced to 20 μm or less.

1-2. The Step of Fining the Carbon Supports on which the Palladium-Containing Particles are Supported This is a step of fining the carbon supports on which the palladium-containing particles are supported and appropriately dispersing the carbon supports. As just described, by fining the carbon supports on which the palladium-containing particles are supported before the palladium-containing particles are covered with the outermost layer, in the production of a membrane electrode assembly using an intended catalyst for fuel cells, the dispersibility of the catalyst in a solvent, etc., can be increased. Also in the production of a membrane electrode assembly, it is not needed to disperse the catalyst for fuel cells under a severe condition. Therefore, the core-shell structure of the fine catalyst particles can be prevented from being broken. As a result, the durability of the catalyst for fuel cells can be increased higher than ever before.

The fining method used in the present invention is not particularly limited, as long as it is a method that is able to efficiently fine the carbon supports on which the palladium-containing particles are supported. The fining method used in this step is preferably a method by which at least one of the following physical properties of the carbon supports obtained after the fining is within the range to be described below: the median diameter $x_{50}$ in the cumulative distribution on a volumetric basis, the 90% diameter $x_{90}$ in the cumulative distribution on a volumetric basis, the mean volume diameter, the standard deviation σ in the particle size distribution, the mean number diameter, and the mean area diameter.

As the fining method used in this step, for example, there may be mentioned stirring devices such as a homogenizer, a bead mill, a shear mixer, a roll mill, a bottle-on roll mill, etc. The stirring devices can be used alone or in combination of two or more.

In this step, the carbon supports on which the palladium-containing particles are supported can be fined by the stirring device after the carbon supports are freeze-dried.

A solvent can be used to fine the carbon supports on which the palladium-containing particles are supported. As the solvent, water or an organic solvent can be used. To fine the carbon supports on which the palladium-containing particles are supported, there may be used water alone, an organic solvent alone or a mixture of both. In the case of using the mixture of water and an organic solvent, it is preferable that after the carbon supports on which the palladium-containing particles are supported are mixed with water, an organic solvent is further added to the mixture.

Examples of the organic solvent that can be used to fine the carbon supports include alcohols such as ethanol, 1-propanol and 2-propanol, and electrolyte solutions such as Nafion (trade name, manufactured by DuPont).

It is preferable that after the fining step, the median diameter $x_{50}$ in the cumulative distribution on a volumetric basis of the carbon supports is 1 to 20 μm. When the median diameter $x_{50}$ is less than 1 μm, the carbon supports are fined too much and may result in difficulties in covering the palladium-containing particles with the outermost layer, as shown in the below-described Production Example 2. On the other hand, when the median diameter $x_{50}$ is more than 20 μm, as shown in the below-described Production Example 3, a good particle size distribution may not be obtained when the catalyst for fuel cells thus obtained is dispersed in a solvent under a relatively mild condition to prepare the ink for electrocatalyst layers.

The lower limit of the median diameter $x_{50}$ in the cumulative distribution on a volumetric basis of the carbon supports after the fining step, is more preferably 3 μm or more, still more preferably 5 μm or more. The upper limit is more preferably 15 μm or less, still more preferably 12 μm or less.

It is preferable that after the fining step, the 90% diameter $x_{90}$ in the cumulative distribution on a volumetric basis of the carbon supports is 10 to 30 μm. When the 90% diameter $x_{90}$ is less than 10 μm, the carbon supports are fined too much and may result in difficulties in covering the palladium-containing particles with the outermost layer, as shown in the below-described Production Example 2. On the other hand, when the 90% diameter $x_{90}$ is more than 30 μm, as shown in the below-described Production Example 3, a good particle size distribution may not be obtained when the catalyst for fuel cells thus obtained is dispersed in a solvent under a relatively mild condition to prepare the ink for electrocatalyst layers.

The lower limit of the 90% diameter $x_{90}$ in the cumulative distribution on a volumetric basis of the carbon supports after the fining step, is more preferably 12 μm or more, still more preferably 15 μm or more. The upper limit is more preferably 25 μm or less, still more preferably 20 μm or less.

It is preferable that after the fining step, the mean volume diameter of the carbon supports is 1 to 20 μm. When the mean volume diameter is less than 1 μm, the carbon supports are fined too much and may result in difficulties in covering the palladium-containing particles with the outermost layer, as shown in the below-described Production Example 2. On the other hand, when the mean volume diameter is more than 20 μm, as shown in the below-described Production Example 3, a good particle size distribution may not be obtained when the catalyst for fuel cells thus obtained is dispersed in a solvent under a relatively mild condition to prepare the ink for electrocatalyst layers.

The lower limit of the mean volume diameter of the carbon supports after the fining step is more preferably 3 μm or more, still more preferably 5 μm or more. The upper limit is more preferably 15 μm or less, still more preferably 12 μm or less.

It is preferable that after the fining step, the standard deviation σ in the particle size distribution of the carbon supports is 1 to 5 μm. When the standard deviation σ is less than 1 μm, the carbon supports are fined too much and may result in difficulties in covering the palladium-containing particles with the outermost layer, as shown in the below-described Production Example 2. On the other hand, when the standard deviation a is more than 5 μm, as shown in the below-described Production Example 3, a good particle size distribution may not be obtained when the catalyst for fuel cells thus obtained is dispersed in a solvent under a relatively mild condition to prepare the ink for electrocatalyst layers.

The lower limit of the standard deviation a in the particle size distribution of the carbon supports after the fining step is more preferably 1.5 μm or more, still more preferably 2 μm or more. The upper limit is more preferably 4.5 μm or less, still more preferably 4 μm or less.

It is preferable that after the fining step, the mean number diameter of the carbon supports is 1 to 10 μm. When the mean number diameter is less than 1 μm, the carbon supports are fined too much and may result in difficulties in covering the palladium-containing particles with the outermost layer, as shown in the below-described Production Example 2. On the other hand, when the mean number diameter is more than 10 μm, a good particle size distribution may not be obtained when the catalyst for fuel cells thus obtained is dispersed in a solvent under a relatively mild condition to prepare the ink for electrocatalyst layers.

The lower limit of the mean number diameter of the carbon supports after the fining step is more preferably 2 μm or more, still more preferably 3 μm or more. The upper limit is more preferably 8 μm or less, still more preferably 7 μm or less.

It is preferable that after the fining step, the mean area diameter of the carbon supports is 1 to 10 μm. When the mean area diameter is less than 1 μm, the carbon supports are fined too much and may result in difficulties in covering the palladium-containing particles with the outermost layer, as shown in the below-described Production Example 2. On the other hand, when the mean area diameter is more than 10 μm, a good particle size distribution may not be obtained when the catalyst for fuel cells thus obtained is dispersed in a solvent under a relatively mild condition to prepare the ink for electrocatalyst layers.

The lower limit of the mean area diameter of the carbon supports after the fining step is more preferably 3 μm or more, still more preferably 5 μm or more. The upper limit is more preferably 9.5 μm or less, still more preferably 9 μm or less.

It is preferable that after the fining step, the particle size distribution of the carbon supports is an approximately normal distribution. The carbon supports having such a particle size distribution are expected to have a particle size distribution within a predetermined range even after the palladium-containing particles are covered with the outermost layer.

Hereinafter, a typical example of this step will be described. This step is not limited to the typical example. In the typical example, the carbon supports on which the palladium particles are supported (hereinafter may be referred to as Pd/C) are used.

First, a predetermined amount of Pd/C, which is a raw material, is prepared. Next, a solvent such as water or alcohol is appropriately added to this Pd/C. Then, the Pd/C is fined and dispersed in the solvent. As the fining method, a stirring method such as the above-described direct homogenizer method is used, taking care not to increase the temperature of the Pd/C-containing dispersion liquid too much. When the temperature of the dispersion liquid is increased, aggregation of Pd/C is caused and sufficient fining effects may not be obtained. Examples of methods for fining the carbon supports without increasing the temperature of the dispersion liquid, include a method in which a stirring device such as a homogenizer is operated intermittently, and a method in which the carbon supports are fined with cooling the dispersion liquid by cooling water.

After fining the carbon supports, measurement of the following physical properties can be carried out by use of a particle size distribution analyzer; the median diameter $x_{50}$ in the cumulative distribution on a volumetric basis of the carbon supports, the 90% diameter $x_{90}$ in the cumulative distribution on a volumetric basis of the carbon supports, the mean volume diameter of the carbon supports, the standard deviation σ in the particle size distribution of the carbon supports, the mean number diameter and the mean area diameter of the carbon supports. When at least one of the physical properties is within the above-specified range, the next outermost layer covering step can begin. As the particle size distribution analyzer used, for example, there may be mentioned Microtrac MT3000 (product name; manufactured by Nikkiso Co., Ltd.) The physical properties such as the median diameter $x_{50}$ can be also measured by a measurement device that uses dynamic light scattering, etc.

1-3. The Step of Covering the Palladium-Containing Particles with a Platinum-Containing Outermost Layer This is a step of covering the palladium-containing particles with a platinum-containing outermost layer after the fining step. This step can be carried out in one stage, or the step can be carried out in two stages.

Hereinafter, an example of covering the core particles with the outermost layer through two-stage reactions, will be explained mainly.

As the two-stage covering step, there may be mentioned an example comprising at least the steps of: covering the palladium-containing particles with a monatomic layer, and replacing the monatomic layer with the platinum-containing outermost layer.

A concrete embodiment of the method is a method in which a monatomic layer is formed on the palladium-containing particles in advance by an underpotential deposition method and then replacing the monatomic layer with the outermost layer. As the underpotential method, a Cu underpotential deposition method (hereinafter may be referred to as Cu-UPD) is preferably used. When the palladium-containing particles are covered with copper, the Cu-UPD method allows the amount of copper deposited on the surface of each palladium-containing particle to be uniform.

In the case of using a platinum layer as the outermost layer, since the lattice constant of palladium is close to that of platinum, a catalyst for fuel cells with high platinum coverage and excellent durability can be produced by the Cu-UPD method.

Hereinafter, a concrete example of the Cu-UPD method in the case of using a platinum layer as the outermost layer, will be described.

Figure 8:
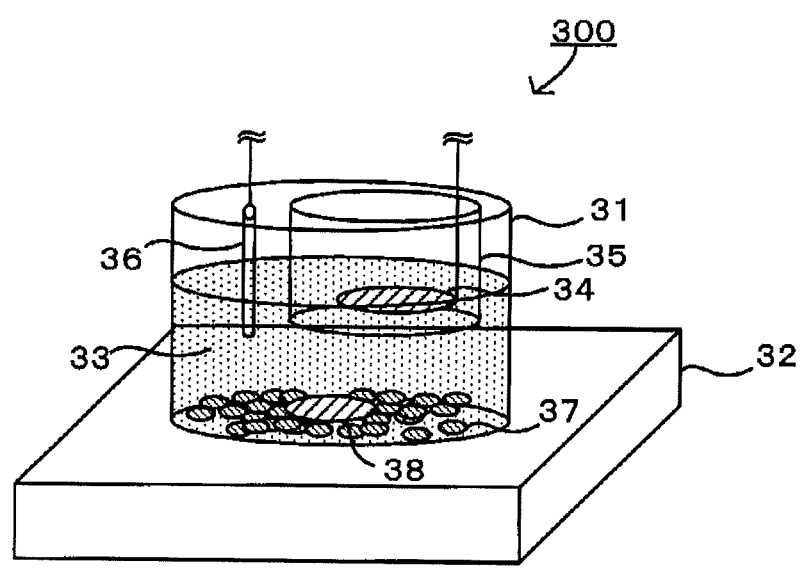
FIG. 8 is a schematic perspective view of an example of the device for covering palladium-containing particles supported on carbon supports with the outermost layer.

FIG. 8 is a schematic perspective view of an example of the device for covering palladium-containing particles supported on carbon supports (hereinafter may be referred to as sample) with the outermost layer. A double wavy line shown in FIG. 8 indicates that a part of the figure is omitted.

A device 300 comprises a reaction container 31 and preferably a magnetic stirrer 32. The reaction container 31 is a container that contains an electroconductive material and serves as a working electrode. The reaction container 31 is preferably installed on the magnetic stirrer 32. A copper ion solution (33 in FIG. 8) at a predetermined concentration is put in the reaction container 31. An acid such as sulfuric acid or nitric acid can be appropriately added to the copper ion solution. It is preferable that an inert gas (e.g., nitrogen) is bubbled into the copper ion solution in advance. It is also preferable that the copper ion solution is prepared so as to have a copper ion concentration of 1 to 100 mM. A potential control device (not shown) is connected to the reaction container 31 from the outside of the container 31, so that the potential of the reaction container is controlled by the potential control device.

Inside the reaction container 31, a compartment 35 and a reference electrode 36 are installed. Inside the compartment 35, a counter electrode 34 is further installed. The compartment 35 functions to prevent a sample from attaching to the counter electrode 34.

First, a sample 37, which has been sufficiently fined by the above-described fining step, and preferably a stirrer chip 38 are put in the reaction container 31 shown in FIG. 8.

Next, with keeping the potential of the reaction container at a predetermined potential by the potential control device, and the surface of the palladium-containing particles is plated with a copper monatomic layer by electrolytic plating, until copper plating reaction becomes a steady reaction and the reaction current is close to 0. The copper ion solution is appropriately stirred by the magnetic stirrer 32, while the potential is kept at a predetermined potential. By stirring the copper ion solution, the sample can be appropriately dispersed in the solution and irregularly deposited on the bottom of the reaction container 31, i.e., on the working electrode. As a result, copper can be evenly electrodeposited on the entire surface of the palladium-containing particles contained in the sample. The time to maintain the potential is about 10 minutes to 20 hours, depending on the amount of the sample.

In the present invention, before covering the palladium-containing particles with the monatomic layer, a pretreatment of the palladium-containing particles can be carried out in advance. In the above-described fining step, irregularities may be formed on the surface of the palladium-containing particles by the stirring method such as the direct homogenizer method. Also in the fining step, the surface of the palladium-containing particles may be oxidized and impurities such as palladium oxide may be formed. In the present invention, the pretreatment of the palladium-containing particles means a treatment in which the irregularities of the surface of the palladium-containing particles are made flat and impurities such as palladium oxide are removed by applying potential to the palladium-containing particles in a liquid electrolyte. Even in the case where the surface of the palladium-containing particles is scratched or oxidized in the fining step, by allowing the atoms on the surface of the palladium-containing particles to repeat dissolution and redeposition in a potential cycle, it is considered that the surface of the palladium-containing particles becomes a flat surface with stable surface energy; the irregularities of the surface of the palladium-containing particles are smoothed; and impurities on the surface of the palladium-containing particles are removed. By removing impurities from the surface of the palladium-containing particles, the coverage of the palladium-containing particles with the outermost layer can be increased higher. In particular, the pretreatment is carried out by applying a potential to the palladium-containing particles in a liquid electrolyte, which is a potential that is less than the standard electrode potential of palladium.

The liquid electrolyte that can be used in the pretreatment is not particularly limited, as long as it is a liquid electrolyte that can dissolve impurities such as palladium oxide by appropriately sweeping the potential in the liquid electrolyte.

Concrete examples of the liquid electrolyte include acids. Concrete examples of acids that can be used in the pretreatment include the above-mentioned acids that can be added to the copper ion solution.

When the pretreatment and the above-described Cu-UPD are carried out in the same reaction container, the liquid electrolyte used in the pretreatment can be mixed with a copper ion solution and used in the Cu-UPD. For example, when sulfuric acid is used as the liquid electrolyte of the pretreatment, the used sulfuric acid can be mixed with a copper sulfate aqueous solution and used in the Cu-UPD.

From the point of view that oxygen in the liquid electrolyte can be removed as much as possible and removal of impurities can be quickly promoted, it is preferable that nitrogen is bubbled into the liquid electrolyte.

From the viewpoint of quick removal of impurities, it is preferable to sweep the potential by allowing the potential to oscillate back and forth several times at a regular potential interval. The swept potential interval is preferably 0.1 to 0.8 V (vs RHE), more preferably 0.2 to 0.6 V (vs RHE), still more preferably 0.3 to 0.4 V (vs RHE).

An example of the pretreatment is as follows. In the pretreatment, the above-described reaction container 31 can be used.

The sample 37, which has been sufficiently fined by the above-described fining step, a liquid electrolyte and preferably the stirrer chip 38 are put in the reaction container 31 shown in FIG. 8. By appropriately applying a potential cycle to the sample 37, the surface of the palladium-containing particles contained in the sample is cleaned, and oxides on the surface of the palladium-containing particles are removed.

After covering the palladium-containing particles with a monatomic layer, the monatomic layer is replaced with the outermost layer. Hereinafter, the case of forming a platinum layer as the outermost layer will be described.

First, a platinum compound such as $K_2PtCl_4$ is dissolved in an acid such as sulfuric acid to prepare a platinum ion solution. It is preferable that an inert gas such as nitrogen is bubbled into the platinum ion solution in advance.

Next, with stirring the copper ion solution in the reaction container 31 by the magnetic stirrer 32, the platinum ion solution prepared is gradually put in the reaction container 31. By this operation, the monatomic copper layer on the surface of the palladium particles can be replaced with a platinum monatomic layer. The time for displacement plating is about 10 minutes to 10 hours, depending on the amount of the sample.

It is preferable that the process starting from the pretreatment of the palladium-containing particles to the formation of the platinum monatomic layer on the surface of the palladium-containing particles, is carried out with bubbling nitrogen into the solution in the reaction container.

The material which constitutes the outermost layer formed in this step, preferably has high catalytic activity. "Catalytic activity" as used herein means the activity of the catalyst for fuel cells.

The outermost layer used in the present invention contains platinum. Platinum is excellent in catalytic activity, particularly excellent in oxygen reduction reaction activity. The lattice constant of platinum is 3.92 Å, while the lattice constant of palladium is 3.89 Å. The lattice constant of palladium is within a band of 5% either side of the lattice constant of platinum. Therefore, by using palladium or a palladium alloy for the core particles and using platinum for the outermost layer, no lattice mismatch is caused between the core particles and the outermost layer, and the core particles are sufficiently covered with platinum.

Also, iridium, ruthenium, rhodium or gold can be contained in the outermost layer, in addition to platinum. In the case of using a platinum alloy for the outermost layer, the platinum alloy can contain platinum and only one kind of metal, or it can contain platinum and two or more kinds of metals.

From the point of view that dissolving of the palladium-containing particles can be more prevented, the coverage of the palladium-containing particles with the outermost layer is preferably 0.8 to 1. When the coverage of the palladium-containing particles with the outermost layer is less than 0.8, the core particles may be dissolved during electrochemical reaction and, as a result, the fine catalyst particles may be deteriorated.

"Coverage of the palladium-containing particles with the outermost layer" as used herein means the ratio of an area of the palladium-containing particles, which is covered with the outermost layer, when the total surface area of the palladium-containing particles is defined as 1. An example of the method for calculating the coverage is as follows. First, the platinum content (A) in the fine catalyst particles is measured by inductively coupled plasma mass spectrometry (ICP-MS) or the like. On the other hand, the average particle diameter of the fine catalyst particles is measured by a transmission electron microscope (TEM) or the like. From the average particle diameter measured, the number of atoms present on the surface of the particles having the average particle diameter is estimated, and the platinum content (B) in the case where a monatomic layer on the surface of the particles are replaced by platinum, is estimated. The value obtained by dividing the platinum content (A) by the platinum content (B) is the "coverage of the palladium-containing particles with the outermost layer."

The outermost layer formed in this step is preferably a monatomic layer. Compared to fine catalyst particles having two or more atomic layers as the outermost layer, the fine catalyst particles having such a monatomic outermost layer are advantageous in that the catalytic performance of the outermost layer is very high and since the outermost layer coverage is small, the material cost is low.

The lower limit of the average particle diameter of the fine catalyst particles is preferably 4 μm or more, more preferably 5 μm or more. The upper limit is preferably 40 μm or less, more preferably 10 μm or less.

Filtering, washing and drying of the fine catalyst particles can be carried out after the monatomic copper layer is replaced with the outermost layer.

Filtering and washing of the fine catalyst particles is not particularly limited, as long as they are carried out by a method that can remove impurities without giving any damage to the covering structure of the fine catalyst particles produced. An example of such a filtering and washing method is a suction filtration method using water, perchloric acid, dilute sulfuric acid, dilute nitric acid, etc.

Drying of the fine catalyst particles is not particularly limited, as long as it is carried out by a method that can remove a solvent, etc. An example of such a drying method include a method in which the fine catalyst particles are vacuum-dried at room temperature for 0.5 to 2 hours and then further dried in an inert gas atmosphere at a temperature of 60 to 80° C. for 1 to 4 hours.

2. Fuel Cell

The fuel cell of the present invention comprises a unit cell that contains a membrane electrode assembly comprising a polyelectrolyte membrane, an anode electrode on one surface of the membrane, the anode electrode containing at least an anode catalyst layer, and a cathode electrode on the other surface of the membrane, the cathode electrode containing at least a cathode catalyst layer, wherein at least one of the anode and cathode catalyst layers contains the catalyst for fuel cells produced by the production method.

FIG. 1 is a view showing an example of the unit fuel cell used in the present invention, and it is also a schematic sectional view along the laminating direction. A membrane electrode assembly 8 comprises a hydrogen ion-conducting polyelectrolyte membrane (hereinafter may be simply referred to as electrolyte membrane) 1 and a pair of a cathode electrode 6 and an anode electrode 7, between which the electrolyte membrane is sandwiched. A unit cell 100 comprises the membrane electrode assembly 8 and a pair of separators 9 and 10 which sandwich the membrane electrode assembly 8 from the outside of the electrodes. Gas channels 11 and 12 are provided at the boundary of the separator and the electrode. In general, a laminate of a catalyst layer and a gas diffusion layer (stacked in order from the electrolyte membrane side) is used as the electrode. That is, the cathode electrode 6 comprises a laminate of a cathode catalyst layer 2 and a gas diffusion layer 4, and the anode electrode 7 comprises a laminate of an anode catalyst layer 3 and a gas diffusion layer 5. The catalyst for fuel cells of the present invention is used in at least one of the anode catalyst layer and the cathode catalyst layer.

The polyelectrolyte membrane is a polyelectrolyte membrane that is generally used in fuel cells. Examples thereof include fluorine-based polyelectrolyte membranes containing fluorine-based polyelectrolytes such as perfluorocarbon sulfonic acid resins typified by Nafion (trademark), and hydrocarbon-based polyelectrolyte membranes containing hydrocarbon-based polyelectrolytes obtained by incorporating a protonic acid group (proton conducting group) such as sulfonic acid group, carboxylic acid group, phosphate group or boronic acid group into a hydrocarbon-based polymer such as an engineering plastic (e.g., polyether ether ketone, polyether ketone, polyether sulfone, polyphenylene sulfide, polyphenylene ether, polyparaphenylene) or a commodity plastic (e.g., polyethylene, polypropylene, polystyrene).

In the present invention, the electrodes each comprise a catalyst layer and a gas diffusion layer.

The anode catalyst layer and the cathode catalyst layer can be formed by use of a catalytic ink containing a catalyst, an electroconductive material and a polyelectrolyte. As the polyelectrolyte, those that are the same as the above-mentioned materials for the polyelectrolyte membrane can be used. As the catalyst, the catalyst for fuel cells of the present invention is used.

The catalyst for fuel cells of the present invention can be used in the anode catalyst layer only, in the cathode catalyst layer only, or in both the anode and cathode catalyst layers. In the case of using the catalyst for fuel cells of the present invention in the anode catalyst layer only, a different catalyst is used in the cathode catalyst layer. In the case of using the catalyst for fuel cells of the present invention in the cathode catalyst layer only, a different catalyst is used in the anode catalyst layer.

As the different catalyst, generally, one obtained by supporting a catalytic component on electroconductive particles is used. The catalytic component is not particularly limited, as long as it has catalytic activity for oxidation reaction of a fuel supplied to the anode electrode or for reduction reaction of an oxidant supplied to the cathode electrode. As the catalytic component, there may be used those that are generally used in solid polymer type fuel cells. Examples thereof include platinum and alloys of platinum and metals such as ruthenium, iron, nickel, manganese, cobalt and copper. As the electroconductive particles, which serve as catalyst supports, there may be used electroconductive carbonaceous materials including carbon particles such as carbon black and carbon fibers, and metal materials including metal particles and fibers. The electroconductive material also functions to impart electroconductivity to the catalyst layer.

The method for producing the catalyst layer is not particularly limited. For example, the catalyst layer can be formed on a surface of a gas diffusion sheet by applying the catalytic ink to the sheet surface and drying the same, or the catalyst layer can be formed on a surface of the polyelectrolyte membrane by applying the catalytic ink to the membrane surface and drying the same. Or, the catalyst layer can be formed on a surface of the polyelectrolyte membrane or the gas diffusion sheet by the following method: the catalytic ink is applied to a surface of a transfer substrate and dried to produce a transfer sheet; the transfer sheet is attached to the polyelectrolyte membrane or the gas diffusion sheet by hot pressing, etc.; and the substrate film of the transfer sheet is removed therefrom.

The catalytic ink is obtained by dispersing the catalyst as mentioned above and an electrolyte for electrodes in a solvent. The solvent of the catalytic ink can be appropriately selected, and there may be used alcohols such as methanol, ethanol and propanol, organic solvents such as N-methyl-2-pyrrolidone (NMP) and dimethyl sulfoxide (DMSO), mixtures of such organic solvents and mixtures of water and such organic solvents. In addition to the catalyst and electrolyte, the catalytic ink can contain other components such as a binder and a water-repellent resin, as needed.

The catalytic ink is preferably dispersed under a milder condition than the above-described condition of fining the carbon supports on which the palladium-containing particles are supported. As described above, conventionally, the catalytic ink has been dispersed under a relatively severe condition so that the catalyst for fuel cells in the catalytic ink has a predetermined particle size distribution. As a result, there is a problem that the core-shell structure of the fine catalyst particles is broken. On the other hand, when the catalytic ink is dispersed under a relatively mild condition so as to maintain the core-shell structure of the fine catalyst particles, the catalyst for fuel cells in the catalytic ink cannot achieve a desired particle size distribution. In the present invention, however, the carbon supports on which the palladium-containing particles are supported, which serve as a raw material, are fined in advance to control the particle diameter and the particle size distribution; therefore, even when the catalytic ink is dispersed under a relatively mild dispersion condition, the catalyst for fuel cells in the catalytic ink can achieve a good particle size distribution. Also, the catalytic ink can be prepared without breaking the core-shell structure of the fine catalyst particles.

Examples of the milder condition than the condition of fining the carbon supports on which the palladium-containing particles are supported include the following: to disperse the catalytic ink by a stirring means which is weaker than the stirring device or method used for the above-described fining; to disperse the catalytic ink for a shorter time than the time required for the above-described fining; and to disperse the catalytic ink by a weaker shear force than the shear force used for the above-described fining. To disperse the catalytic ink by a weaker stirring method than the stirring method used for the above-described fining means, for example, that when a direct homogenizer method is used for the above-described fining, an indirect homogenizer method is used to disperse the catalytic ink.

It is preferable that 90% or more of the catalyst for fuel cells in the dispersed catalytic ink has a particle diameter of 10 μm or less. When more than 10% of the catalyst for fuel cells has a particle diameter of 10 μm or more, the ratio of the catalyst for fuel cells aggregated in the catalytic ink is too high; therefore, the electrode reaction efficiency which is expected from the activity of the catalyst for fuel cells itself may not be achieved.

It is more preferable that 90% or more of the catalyst for fuel cells in the dispersed catalytic ink has a particle diameter of 5 μm or less, and it is still more preferable that 90% or more of the catalyst for fuel cells has a particle diameter of 1 μm or less. Also, it is particularly preferable that the particle diameter of the catalyst for fuel cells in the catalytic ink obtained through the dispersion is within a range of 0.1 to 1 μm.

As used herein, "90% or more of the catalyst for fuel cells in the dispersed catalytic ink has a particle diameter of 10 μm or less" means that when the catalyst for fuel cells in the dispersed catalytic ink is measured for particle size distribution to make a particle size distribution graph with frequency (%) on the vertical axis and particle diameter (μm) on the horizontal axis, 90% or more of the area which indicates the particle size distribution is present in the region of 10 μm or less.

The method for applying the catalytic ink and the method for drying the same can be appropriately selected. Examples of the method for applying the catalytic ink include a spraying method, a screen printing method, a doctor blade method, a gravure printing method and a die coating method. Examples of the method for drying the catalytic ink include drying under reduced pressure, heat drying, and heat drying under reduced pressure. The condition of drying under reduced pressure or the condition of heat drying is not particularly limited and can be appropriately determined. The thickness of the catalyst layer is not particularly limited and can be about 1 to 50 μm.

As the gas diffusion sheet for forming the gas diffusion layer, it is preferable to employ one with gas diffusivity which makes it possible to efficiently supply fuel to the catalyst layer, electroconductivity, and strength which is required of the material constituting the gas diffusion layer. Examples of the gas diffusion sheet used in the present invention includes those made of electroconductive porous materials such as carbonaceous porous materials and metallic porous materials or metallic mesh, the carbonaceous porous materials including carbon paper, carbon cloth and carbon felt, and the metallic porous materials or metallic mesh including those made of metals such as titanium, aluminum, aluminum alloy, nickel, nickel-chromium alloy, copper, copper alloy, silver, zinc alloy, lead alloy, niobium, tantalum, iron, stainless steel, gold and platinum. The electroconductive porous material preferably has a thickness of about 50 to 500 μm.

The gas diffusion sheet can be a single layer made of the electroconductive porous material mentioned above, or a combination of the single layer and a water-repellent layer, the water-repellent layer being provided on a surface of the single layer, which faces the catalyst layer. In general, the water-repellent layer has a porous structure that contains an electroconductive powder of carbon particles or carbon fibers, a water-repellent resin such as polytetrafluoroethylene (PTFE), etc. The water-repellent layer is not a necessity; however, it is advantageous in that the drainage property of the gas diffusion layer can be increased with maintaining the liquid water amount in the catalyst layer and the polyelectrolyte membrane at an appropriate level; moreover, electrical contact between the gas diffusion layer and the catalyst layer can be improved.

The polyelectrolyte membrane having the catalyst layer formed thereon by the above method and the gas diffusion sheet are appropriately stacked and attached to each other by hot pressing, etc., thus obtaining the membrane electrode assembly.

It is preferable that the membrane electrode assembly thus produced is sandwiched between separators having reaction gas channels to form a unit cell. As the separator, there may be used a separator having electroconductivity and gas sealing properties and being able to function as a current collector and gas sealer can be used, such as a carbon separator being made of a composite material of resin and carbon fibers and containing a high concentration of carbon fibers, or a metallic separator made of a metal material. Example of the metallic separator include a metallic separator made of metal materials with excellent corrosion resistance and a metallic separator in which the surface is covered with carbon or a metal material with excellent corrosion resistance to apply a coating for increasing corrosion resistance. The reaction gas channels can be formed by appropriate compression molding or cutting of the separator.

EXAMPLES

Hereinafter, the present invention will be described in more detail, by way of examples and comparative examples. The present invention is not limited to the examples, however.

1. Fining of Carbon Supports on which Palladium Particles are Supported

Production Example 1

First, 0.55 g of carbon supports on which palladium particles are supported (hereinafter may be referred to as Pd/C) was put in a container. Next, 20 mL of ultrapure water was put in the container to sufficiently wet the Pd/C. Then, 15 mL ethanol was put in a container, thus preparing a Pd/C mixture.

Next, by use of a homogenizer with the maximum output power of 200 W (output power 50%), the Pd/C mixture was stirred by the direct homogenizer method for 45 minutes, thereby fining and dispersing the Pd/C in the mixture (fining step). At this time, the homogenizer was intermittently operated so as not to excessively increase the temperature of the Pd/C mixture. In particular, cycles of homogenizer operation for 2 seconds and stop for 2 seconds were repeated, and the stirring of the Pd/C mixture was continued until the total operation time reached 45 minutes. Also, the stirring was carried out with cooling the entire container by cooling water at about 6° C.

The resulting Pd/C dispersion liquid dispersed by the homogenizer was filtered to collect the fined Pd/C. Then, about 2 L of pure water at normal temperature (15 to 30° C.) was added to the fined Pd/C in 5 batches. Every time the pure water was added, the filtration and the washing were carried out, thus preparing palladium-supported carbon of Production Example 1.

Production Example 2

First, 0.5 g of Pd/C was put in a container. Next, 150 mL of ultrapure water was put in the container to sufficiently wet the Pd/C. Then, to increase the degree of dispersion, 0.55 mL of an electrolyte solution (DE2020CS manufactured by DuPont) was added thereto, thus preparing a Pd/C mixture.

Next, by use of a homogenizer with the maximum output power of 600 W (output power 50%), the Pd/C mixture was stirred by the direct homogenizer method for 15 minutes, thereby fining and dispersing the Pd/C in the mixture (fining step). At this time, the homogenizer was intermittently operated so as not to excessively increase the temperature of the Pd/C mixture. In particular, cycles of homogenizer operation for 2 seconds and stop for 2 seconds were repeated, and the stirring of the Pd/C mixture was continued until the total operation time reached 15 minutes. Also, the stirring was carried out with cooling the entire container by cooling water at about 6° C.

The resulting Pd/C dispersion liquid dispersed by the homogenizer was filtered to collect the fined Pd/C. Then, about 2 L of pure water at normal temperature (15 to 30° C.) was added to the fined Pd/C in 5 batches. Every time the pure water was added, the filtration and the washing were carried out, thus preparing palladium-supported carbon of Production Example 2.

2. Production of Catalyst for Fuel Cells

Example 1

2-1. Pretreatment of Palladium-Supported Carbon

First, pretreatment of the palladium-supported carbon of Production Example 1 was carried out. The pretreatment was carried out by use of the device shown in FIG. 8.

A reaction container 31 is a cylindrical container being made of titanium and having a diameter of 15 cm. The surface of the container is coated with $RuO_2$, which is resistant to corrosion. The reaction container 31 itself functions as a working electrode. The reaction container 31 was installed on a magnetic stirrer 32. Then, 0.55 L of 0.05M sulfuric acid (33 shown in FIG. 8) was put in the reaction container 31. In advance, nitrogen was bubbled into the sulfuric acid in the reaction container. A potential control device such as potentiostat (not shown) was connected to the reaction container from the outside of the container, thereby controlling the potential of the reaction container.

A counter electrode 34, which is a platinum mesh plated with platinum black, was placed inside a compartment 35, which is a compartment in which fritted glass (ground glass) is attached to the bottom thereof. The compartment was installed in the reaction container 31 by a polystyrene float (not shown). The compartment 35 functions to prevent attachment of the palladium-supported carbon powder to the counter electrode 34.

A silver-silver chloride electrode 36 (a leak free Ag/AgCl/KCl (3M) electrode manufactured by Cypress Systems Inc.) was used as a reference electrode. The potential measured by use of the Ag/AgCl/KCl electrode was converted to the RHE scale, based on the potential difference between the Ag/AgCl/KCl electrode and the reversible hydrogen electrode measured in advance.

The palladium-supported carbon 37 of Production Example 1 and a stirrer chip 38 were put in the reaction container 31 shown in FIG. 8. A potential cycle was appropriately applied to clean the palladium particle surface and remove oxides therefrom.

2-2. Formation of Copper Monatomic Layer

A copper(II) sulfate ($CuSO_4$) aqueous solution was put in the reaction container 31 shown in FIG. 8. The amount of the aqueous solution was adjusted so that the copper ion concentration of the solution in the reaction container 31 was 50 mM after the addition of the solution.

With keeping the potential of the reaction container at 0.4 V (vs RHE), the palladium particle surface was plated with a copper monatomic layer by electrolytic plating, until copper plating reaction became steady and the reaction current was close to 0. The solution was appropriately stirred by the magnetic stirrer 32, while the potential was kept at 0.4 V. In the device shown in FIG. 8, the reaction container 31 itself functions as a working electrode. Accordingly, due to the palladium-supported carbon powder attached to the bottom of the reaction container 31, electricity is conducted to the palladium-supported carbon. The stirring with the magnetic stirrer 32 was carried out in order that the palladium-supported carbon powder was appropriately dispersed in the copper(II) sulfate aqueous solution to irregularly deposit the palladium-supported carbon on the bottom of the reaction container 31, i.e., on the $Ti/RuO_2$ electrode, thus electrodepositing copper on the surface of all the palladium particles in the palladium-supported carbon.

At the time of the formation of the copper monatomic layer, electrolytic copper plating charge and current were also measured. The results will be described below.

2-3. Formation of Platinum Monatomic Layer $K_2PtCl_4$ was dissolved in 0.05 M sulfuric acid to prepare a platinum ion solution. Nitrogen was bubbled into the platinum ion solution in advance.

With stirring the solution in the reaction container 31 with the magnetic stirrer 32, the platinum ion solution was gradually added to the solution in the reaction container 31. By this operation, the copper monatomic layer on the surface of the palladium particles was replaced with a platinum monatomic layer. The process starting from the pretreatment of the palladium-supported carbon to the formation of the platinum monatomic layer was carried out with bubbling nitrogen into the reaction solution in the reaction container 31.

2-4. Washing, Fining and Dispersing of Catalyst for Fuel Cells

A catalyst for fuel cells was obtained by filtering the reaction solution, the catalyst comprising fine catalyst particles in which the surface of the palladium particles was covered with the platinum monatomic layer, and carbon supports on which the fine catalyst particles were supported. Then, about 4 L of pure water at normal temperature (15 to 30° C.) was added to the catalyst for fuel cells in 10 batches, and the catalyst for fuel cells was filtered for washing every time the pure water was added thereto.

The washed catalyst for fuel cells was dried at a temperature of 60° C. for 12 hours. The dried catalyst for fuel cells was appropriately ground with an agate mortar and a pestle, thus producing the catalyst for fuel cells of Example 1.

Comparative Example 1

The catalyst for fuel cells of Comparative Example 1 was produced in the same manner as Example 1, except that the palladium-supported carbon of Production Example 2 was used in place of the palladium-supported carbon of Production Example 1. The pretreatment of the palladium-supported carbon, the formation of the copper monatomic layer on the palladium particles, the displacement Pt plating, and the washing and fining of the catalyst for fuel cells obtained were carried out in the same manner as Example 1.

Comparative Example 2

The catalyst for fuel cells of Comparative Example 2 was produced in the same manner as Example 1, except that a palladium-supported carbon that was not subjected to the fining treatment (hereinafter may be referred to as palladium-supported carbon of Production Example 3) was used in place of the palladium-supported carbon of Production Example 1. The pretreatment of the palladium-supported carbon, the formation of the copper monatomic layer on the palladium particles, the displacement Pt plating, and the washing and fining of the catalyst for fuel cells obtained were carried out in the same manner as Example 1.

3. Production of Membrane Electrode Assembly

Example 2

First, 0.4 g of the catalyst for fuel cells of Example 1 was put in a container. Next, 15 g of ultrapure water was put in the container to sufficiently wet the catalyst for fuel cells. Then, 12.75 g of ethanol and 0.9 g of a Nafion (trade name) solution (DE2020CS manufactured by DuPont) were put in the container, thus preparing a mixture of the catalyst for fuel cells (hereinafter may be referred to as catalyst mixture).

Next, the catalyst mixture was stirred by the direct homogenizer method for 5 minutes, thereby fining and dispersing the catalyst for fuel cells in the catalyst mixture. At this time, the homogenizer was intermittently operated so as not to excessively increase the mixture temperature. In particular, cycles of homogenizer operation for 2 seconds and stop for 2 seconds were repeated, and the stirring of the mixture was continued until the total operation time reached 5 minutes. Also, the stirring was carried out with cooling the entire container by cooling water at about 6° C.

The resulting catalyst dispersion liquid dispersed by the direct homogenizer method was sprayed to both surfaces of a polyelectrolyte membrane (Nafion (trade name) membrane), thus producing the membrane electrode assembly of Example 2.

Comparative Example 3

The membrane electrode assembly of Comparative Example 3 was produced in the same manner as Example 2, except that the catalyst for fuel cells of Comparative Example 2 was used in place of the catalyst for fuel cells of Comparative Example 1. The preparation and spraying of the catalyst mixture were carried out in the same manner as Example 2.

4. Measurement of Electrolytic Copper Plating Charge and Current

In Example 1 and Comparative Example 1, at the time of the formation of the copper monatomic layer, electrolytic copper plating charge and current were measured. The electrolytic copper plating charge was calculated from a cyclic voltammogram (hereinafter may be referred to as CV) obtained at the time of the formation of the copper monatomic layer. The electrolytic copper plating current was measured by use of a potentiostat (HZ-5000 manufactured by Hokuto Denko Corporation) and with keeping the potential at 0.4 V (vs RHE) as described above.

Figure 4:
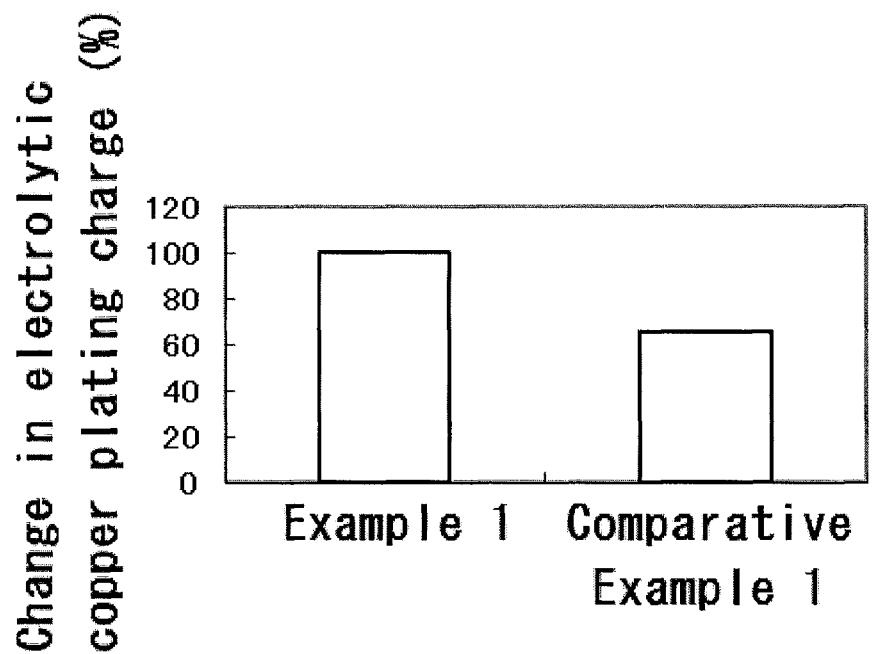
FIG. 4 is a bar graph that compares electrolytic copper plating charge in Example 1 with that in Comparative Example 1.

FIG. 4 is a bar graph that compares electrolytic copper plating charge in Example 1 with that in Comparative Example 1. The vertical axis of FIG. 4 indicates the ratio of change in electrolytic copper plating charge when the electrolytic copper plating charge in Example 1 is defined as 100%.

As is clear from FIG. 4, when the electrolytic copper plating charge in Example 1 is defined as 100%, the electrolytic copper plating charge in Comparative Example 1 is 65%. Therefore, it is clear that the electrolytic copper plating charge in Comparative Example 1, in which the carbon supports were fined under the severer fining condition, is decreased lower than that in Example 1, in which the carbon supports were fined under the appropriate condition.

Figure 5:
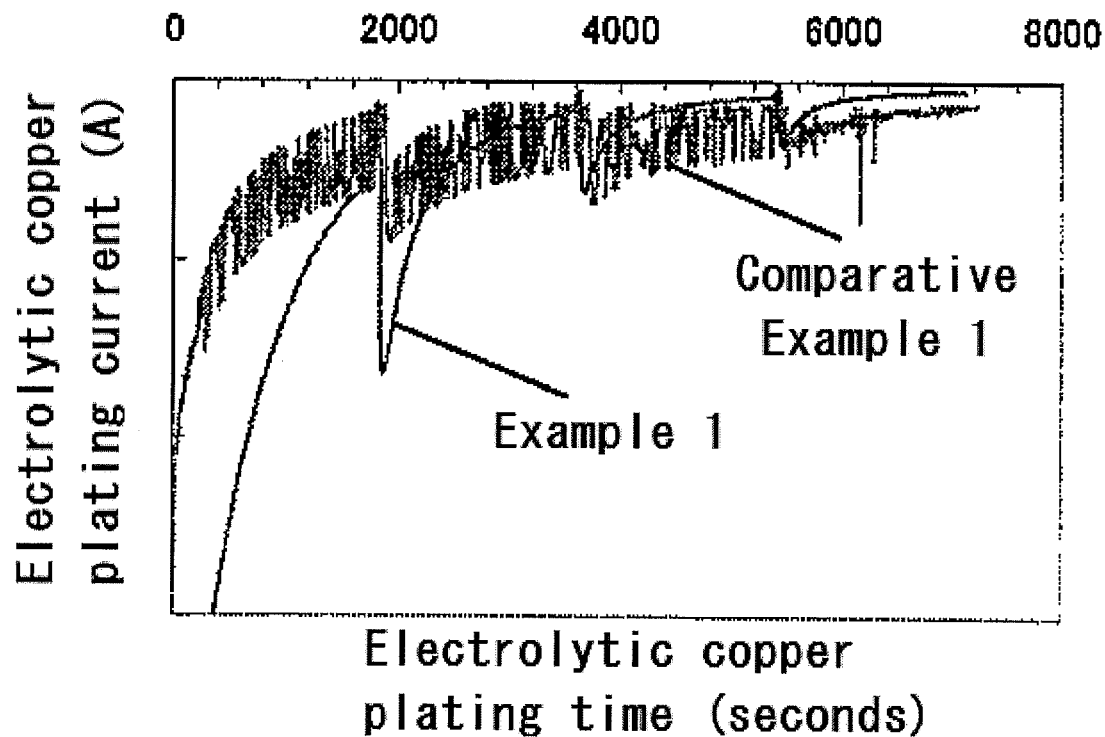
FIG. 5 is a graph showing electrolytic copper plating current in Example 1 and that in Comparative Example 1, which are overlapped on each other.

FIG. 5 is a graph showing electrolytic copper plating current in Example 1 and that in Comparative Example 1, which are overlapped on each other. The graph shown in FIG. 5 is a graph with electrolytic copper plating time (seconds) on the horizontal axis and electrolytic copper plating current (A) on the vertical axis. The copper ion solution was stirred about 1,800 seconds after the electrolytic copper plating had started, about 3,600 seconds after the electrolytic copper plating had started, and about 5,400 seconds after the electrolytic copper plating had started.

As is clear from FIG. 5, the graph of Example 1 is a relatively shallow curve. Meanwhile, the graph of Comparative Example 1 has many points where the absolute value of current is smaller than the graph of Example 1. Also, the graph of Comparative Example 1 shows frequent vibration in the direction of the vertical axis. Therefore, in Comparative Example 1 in which the carbon supports fined under the severer fining condition, the current value was frequently vibrated to show a noise which indicates poor electricity conduction to the palladium-supported carbon.

From the results shown in FIGS. 4 and 5, it is clear that in the case where the carbon supports were fined under the severer condition, the amount of copper covering the palladium particles by the electrolytic plating is extremely small, and the electrolytic plating cannot be stably carried out. In the device shown in FIG. 8, the reaction container 31 itself functions as a working electrode, and due to the palladium-supported carbon powder attached to the bottom of the reaction container 31, electricity is conducted to the palladium-supported carbon. According to the results shown in FIGS. 4 and 5, when the palladium-supported carbon is too fine, the palladium-supported carbon is floated in the copper ion solution by movements of the copper ion solution caused by bubbling, etc. Therefore, it is considered that a long time is required to cover the palladium particles with the copper monatomic layer.

5. Measurement of Particle Size Distribution

Measurement of particle size distribution was carried out by a particle size analyzer on the palladium-supported carbons of Production Examples 1 to 3, the catalyst for fuel cells in the catalyst mixture of Example 2, and the catalyst for fuel cells in the catalyst mixture of Comparative Example 3. As the particle size analyzer, Microtrac MT3000 (a particle size analyzer manufactured by Nikkiso Co., Ltd.) was used.

Table 1 shows the following properties of the palladium-supported carbons of Production Examples 1 to 3: mean volume diameter (hereinafter may be referred to as MV), mean number diameter (hereinafter may be referred to as MN), mean area diameter (hereinafter may be referred to as MA), calculated specific surfaces area (hereinafter may be referred to as CS), standard deviation (hereinafter may be referred to as SD), median diameter in the cumulative distribution on a volumetric basis (hereinafter may be referred to as $x_{50}$) and 90% diameter in the cumulative distribution on a volumetric basis (hereinafter may be referred to as $x_{90}$). Table 2 shows the above properties (MV, MN, MA, CS, SD, $x_{50}$ and $x_{90}$) of the catalysts for fuel cells in the catalyst mixtures of Example 2 and Comparative Example 3.

TABLE 1

|  | Production Example 1 | Production Example 2 | Production Example 3 |
| --- | --- | --- | --- |
| MV (μm) | 10.323 | 0.642 | 35.468 |
| MN (μm) | 5.527 | 0.229 | 5.010 |
| MA (μm) | 8.669 | 0.409 | 16.732 |
| CS | 0.692 | 14.689 | 0.359 |
| SD (μm) | 3.733 | 0.358 | 25.752 |
| $x_{50}$ (μm) | 9.777 | 0.506 | 29.720 |
| $x_{90}$ (μm) | 15.490 | 1.452 | 70.140 |

TABLE 2

| Type of palladium-supported carbon | Example 2 Production Example 1 | Comparative Example 3 Production Example 3 |
| --- | --- | --- |
| MV (μm) | 1.586 | 7.190 |
| MN (μm) | 0.121 | 0.220 |
| MA (μm) | 0.242 | 0.591 |
| CS | 24.762 | 10.161 |
| SD (μm) | 0.493 | 5.829 |
| $x_{50}$ (μm) | 0.367 | 0.730 |
| $x_{90}$ (μm) | 2.105 | 27.700 |

Figure 10:
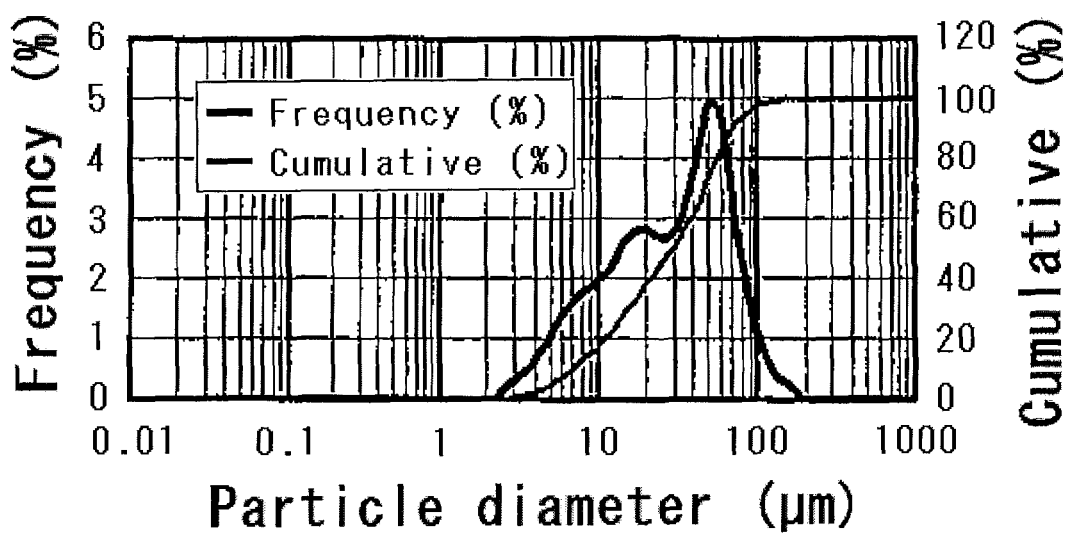
FIG. 10 is a graph showing the particle size distribution and cumulative curve of a palladium-supported carbon of Production Example 3, which are overlapped on each other.

FIG. 10 is a graph showing the particle size distribution and cumulative curve of a palladium-supported carbon of Production Example 3, which are overlapped on each other. FIG. 10 is a graph with particle diameter (μm) on the horizontal axis, frequency (%) on the left vertical axis, and cumulative index (%) on the right horizontal axis. In FIG. 10, a thick line graph shows particle size distribution, and a thin line graph shows a cumulative curve.

Table 1 shows that the palladium-supported carbon of Production Example 3 has an MV of 35.468 μm, an MN of 5.010 μm, an MA of 16.732 μm, a CS of 0.359, and an SD of 25.752 μm. Accordingly, the MN is within a range of 1 to 10 μm. On the other hand, the MV is a value which is more than 20 μm; the MA is a value which is more than 10 μm; and the SD is a value which is more than 5 μm.

Table 1 shows that the palladium-supported carbon of Production Example 3 has an $x_{50}$ of 29.720 μm and an $x_{90}$ of 70.140 μm. Accordingly, the $x_{50}$ is a value which is more than 20 μm, and the $x_{90}$ is a value which is more than 30 μm.

From FIG. 10, it is clear that in the palladium-supported carbon of Production Example 3, most of the particles have a particle diameter of 10 to 100 μm.

Figure 11:
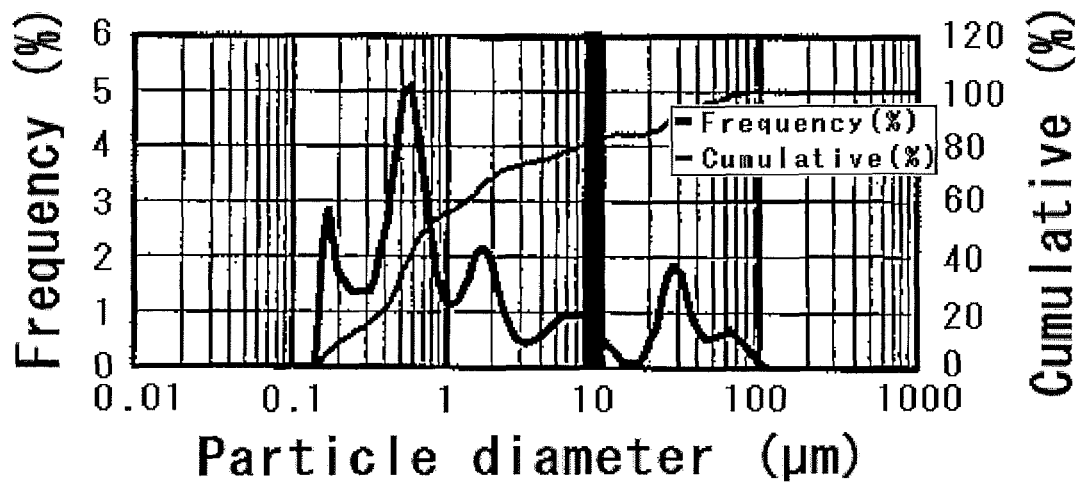
FIG. 11 is a graph showing the particle size distribution and cumulative curve of a catalyst for fuel cells used in Comparative Example 3, which are overlapped on each other.

FIG. 11 is a graph showing the particle size distribution and cumulative curve of a catalyst for fuel cells used in Comparative Example 3, which are overlapped on each other. FIG. 11 is a graph with particle diameter (μm) on the horizontal axis, frequency (%) on the left vertical axis, and cumulative index (%) on the right horizontal axis. In FIG. 11, a thick line graph shows particle size distribution, and a thin line graph shows a cumulative curve.

Table 2 shows that the catalyst for fuel cells used in Comparative Example 3 has an MV of 7.190 μm, an MN of 0.220 μm, an MA of 0.591 μm, a CS of 10.161, and an SD of 5.829 μm. Table 2 also shows that the catalyst for fuel cells used in Comparative Example 3 has an $x_{50}$ of 0.730 μm and an $x_{90}$ of 27.700 μm.

From FIG. 11, it is clear that particles having a particle diameter of 10 μm or more remained in the catalyst for fuel cells used in Comparative Example 3. From this result, it is clear that the catalyst for fuel cells comprising, as a raw material, the palladium-supported carbon having an MV of more than 20 μm, an MA of more than 10 μm, an SD of more than 5 μm, an $x_{50}$ of more than 20 μm, and an $x_{90}$ of more than 30 μm, cannot obtain a good particle size distribution when it is fined by a weaker dispersion method than conventional dispersion methods.

Figure 2:
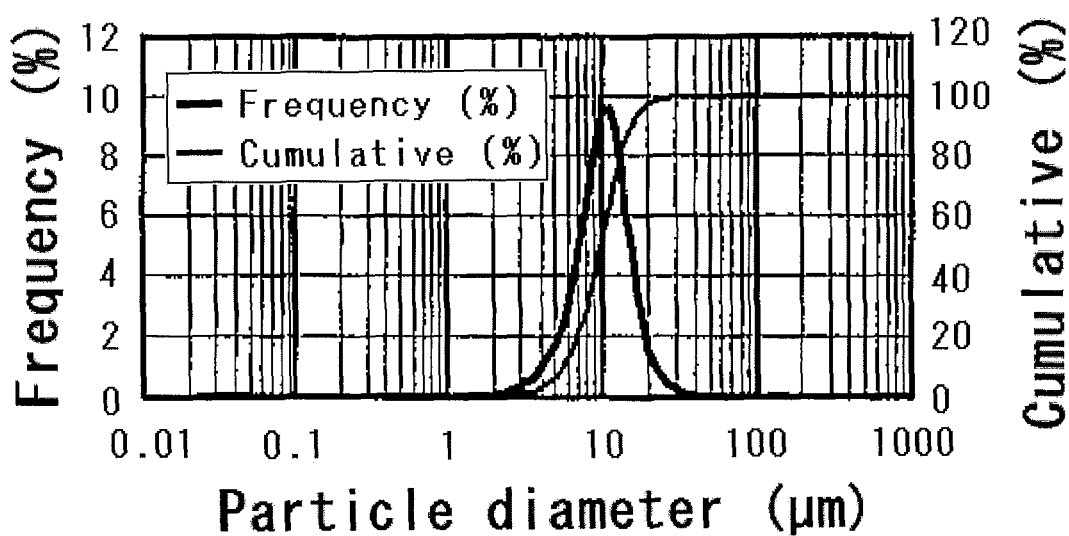
FIG. 2 is a graph showing the particle size distribution and cumulative curve of a palladium-supported carbon of Production Example 1, which are overlapped on each other.

FIG. 2 is a graph showing the particle size distribution and cumulative curve of a palladium-supported carbon of Production Example 1, which are overlapped on each other. FIG. 2 is a graph with particle diameter (μm) on the horizontal axis, frequency (%) on the left vertical axis, and cumulative index (%) on the right horizontal axis. In FIG. 2, a thick line graph shows particle size distribution, and a thin line graph shows a cumulative curve.

Table 1 shows that the palladium-supported carbon of Production Example 1 has an MV of 10.323 μm, an MN of 5.527 μm, an MA of 8.669 μm, a CS of 0.692, and an SD of 3.733 μm. Accordingly, the MV is within a range of 1 to 20 μm; the MN is within a range of 1 to 10 μm; the MA is within a range of 1 to 10 μm; and the SD is within a range of 1 to 5 μm.

Table 1 shows that the palladium-supported carbon of Production Example 1 has an $x_{50}$ of 9.777 μm and an $x_{90}$ of 15.490 μm. Accordingly, the $x_{50}$ is within a range of 1 to 20 μm, and the $x_{90}$ is within a range of 10 to 30 μm.

From FIG. 2, it is clear that the particle size distribution of the palladium-supported carbon of Production Example 1 is an almost normal distribution, and the peak of the particle size distribution is about 10 μm.

Figure 3:
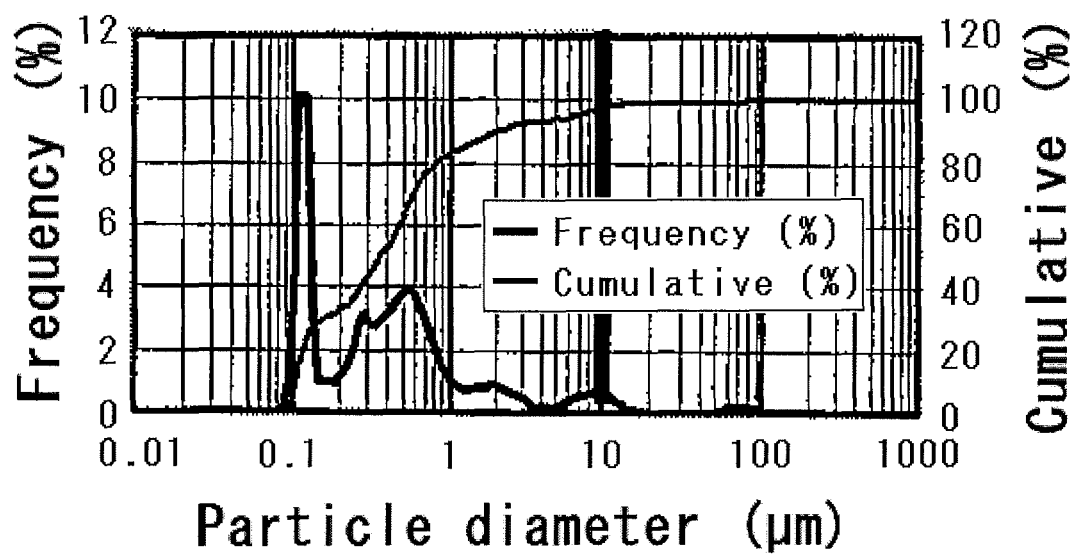
FIG. 3 is a graph showing the particle size distribution and cumulative curve of a catalyst for fuel cells used in Example 2, which are overlapped on each other.

FIG. 3 is a graph showing the particle size distribution and cumulative curve of a catalyst for fuel cells used in Example 2, which are overlapped on each other. FIG. 3 is a graph with particle diameter (μm) on the horizontal axis, frequency (%) on the left vertical axis, and cumulative index (%) on the right horizontal axis. In FIG. 3, a thick line graph shows particle size distribution, and a thin line graph shows a cumulative curve.

Table 2 shows that the catalyst for fuel cells used in Example 2 has an MV of 1.586 μm, an MN of 0.121 μm, and MA of 0.242 μm, a CS of 24.762, and an SD of 0.493 μm. Also Table 2 shows that the catalyst for fuel cells used in Example 2 has an $x_{50}$ of 0.367 μm and an $x_{90}$ of 2.105 μm.

According to FIG. 3, almost no particles having a particle diameter of 10 μm or more remain in the catalyst for fuel cells used in Example 2. From this result, it is clear that the catalyst for fuel cells comprising, as a raw material, the palladium-supported carbon having an MV within a range of 1 to 20 μm, an MN within a range of 1 to 10 μm, an MA within a range of 1 to 10 μm, an SD within a range of 1 to 5 μm, an $x_{50}$ within a range of 1 to 20 μm, and an $x_{90}$ within a range of 10 to 30 μm, can obtain a good particle size distribution, with maintaining the particle structure, even when the it is fined by a weaker dispersion method than conventional dispersion methods.

Figure 9:
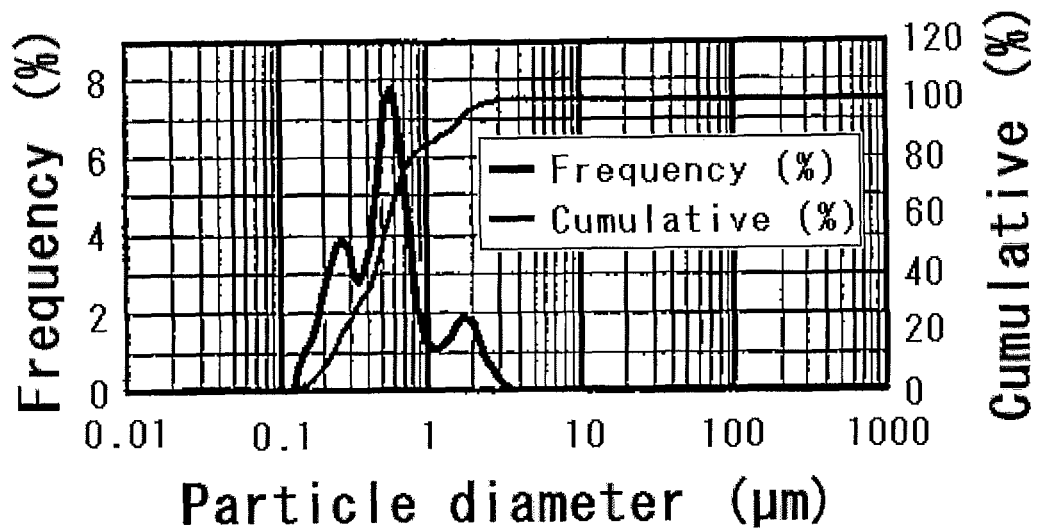
FIG. 9 is a graph showing the particle size distribution and cumulative curve of a palladium-supported carbon of Production Example 2, which are overlapped on each other.

FIG. 9 is a graph showing the particle size distribution and cumulative curve of a palladium-supported carbon of Production Example 2, which are overlapped on each other. FIG. 9 is a graph with particle diameter (μm) on the horizontal axis, frequency (%) on the left vertical axis, and cumulative index (%) on the right horizontal axis. In FIG. 9, a thick line graph shows particle size distribution, and a thin line graph shows a cumulative curve.

Table 1 shows that the palladium-supported carbon of Production Example 2 has an MV of 0.642 μm, an MN of 0.229 μm, an MA of 0.409 μm, a CS of 14.689, and an SD of 0.358 μm. Accordingly, the MV is less than 1 μm; the MN is less than 1 μm; the MA is less than 1 μm; and the SD is less than 1 μm.

Table 1 shows that the palladium-supported carbon of Production Example 2 has an $x_{50}$ of 0.506 μm and an $x_{90}$ of 1.452 μm. Accordingly, the $x_{50}$ is less than 1 μm, and the $x_{90}$ is less than 10 μm.

From FIG. 9, it is clear that in the palladium-supported carbon of Production Example 2, most of the particles have a particle diameter of 0.1 to 1 μm.

However, as described above, it is clear that poor electricity conduction is caused between the palladium-supported carbon of Production Example 2 and the electrode at the time of electrolytic copper plating.

6. Palladium Dissolution Test (Durability Test)

6-1. Preparation of Catalyst for Fuel Cells

Reference Example 1

A catalyst for fuel cells was prepared in the same manner as Example 1, except that the palladium-supported carbon of Production Example 3 was used in place of the palladium-supported carbon of Production Example 1. The pretreatment of the palladium-supported carbon, the formation of the copper monatomic layer on the palladium particles, the displacement Pt plating, and the washing and fining of the catalyst for fuel cells obtained were carried out in the same manner as Example 1.

Next, 0.05 g of the fined catalyst for fuel cells was put in a container. Then, 30 mL of ultrapure water was put in the container, thus preparing a mixture of the catalyst for fuel cells.

Then, the catalyst mixture was stirred by the direct homogenizer method for 4 minutes, thereby fining and dispersing the catalyst for fuel cells in the mixture, thus obtaining the catalyst for fuel cells of Reference Example 1.

Reference Example 2

A catalyst for fuel cells was prepared in the same manner as Example 1, except that the palladium-supported carbon of Production Example 3 was used in place of the palladium-supported carbon of Production Example 1. The pretreatment of the palladium-supported carbon, the formation of the copper monatomic layer on the palladium particles, the displacement Pt plating, and the washing and fining of the catalyst for fuel cells obtained were carried out in the same manner as Example 1.

Next, 0.05 g of the fined catalyst for fuel cells was put in a container. Then, 30 mL of ultrapure water was put in the container, thus preparing a mixture of the catalyst for fuel cells.

Then, the catalyst mixture was stirred by the direct homogenizer method for 30 minutes, thereby fining and dispersing the catalyst for fuel cells in the catalyst mixture.

Then, the catalyst mixture stirred by the direct homogenizer method was further stirred by the indirect homogenizer method for 5 hours, thereby fining and dispersing the catalyst for fuel cells in the catalyst mixture.

Through the dispersion processes by the direct and indirect homogenizer methods, the catalyst for fuel cells of Reference Example 2 was obtained.

Reference Example 3

A catalyst for fuel cells of Reference Example 3 was obtained in the same manner as Example 1, except that the palladium-supported carbon of Production Example 3 was used in place of the palladium-supported carbon of Production Example 1. The pretreatment of the palladium-supported carbon, the formation of the copper monatomic layer on the palladium particles, the displacement Pt plating, and the washing and fining of the catalyst for fuel cells obtained were carried out in the same manner as Example 1. That is, in Reference Example 3, no dispersion was carried out after the covering with Pt.

6-2. Palladium Dissolution Test

A palladium dissolution test was carried out on the catalysts for fuel cells of Reference Examples 1 to 3.

First, each catalyst for fuel cells was immersed in 0.1 mol/L sulfuric acid at 80° C. One hour later, the sulfuric acid was filtered. For the thus-obtained filtrate, the palladium element dissolved in the sulfuric acid was quantitated by inductively coupled plasma mass spectroscopy (ICP-MS).

Figure 6:
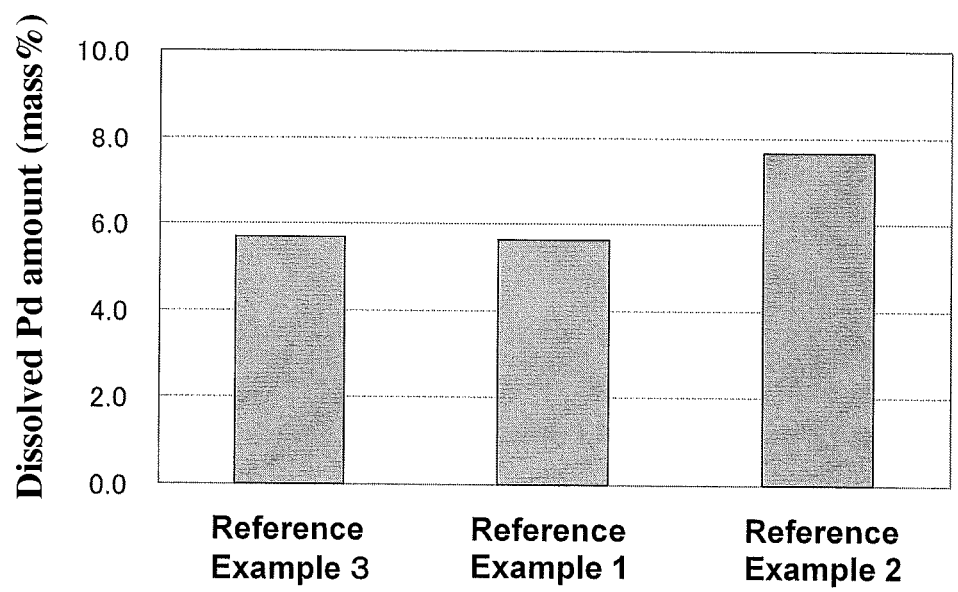
FIG. 6 is a bar graph showing dissolved palladium amounts eluted from palladium-supported carbons of Reference Examples 1 to 3.

FIG. 6 is a bar graph showing dissolved palladium amounts eluted from palladium-supported carbons of Reference Examples 1 to 3. The graph of FIG. 6 is a graph with dissolved palladium amount (mass %) on the vertical axis. FIG. 6 shows the following: in the catalyst for fuel cells of Reference Example 1, the dissolved palladium amount is 5.65 mass %; in the catalyst for fuel cells of Reference Example 2, the dissolved palladium amount is 7.67 mass %; and in the catalyst for fuel cells of Reference Example 3, the dissolved palladium amount is 5.70 mass %.

Accordingly, it is clear that the dissolved palladium amount of Reference Example 2, in which the catalyst for fuel cells were fined under the severer condition, is about 1.3 times higher than Reference Example 1, in which the catalyst for fuel cells were fined under the milder condition, and Reference Example 3, in which the fining treatment was not carried out. It is also clear that the dissolved palladium amount of Reference Example 1, in which the catalyst for fuel cells were fined under the milder condition, is at the same level as the dissolved palladium amount of Reference Example 3, in which the fining treatment was not carried out.

From the comparison between Reference Example 1 and Reference Examples 2 and 3, it is clear that palladium contained in a general catalyst for fuel cells having a core-shell structure is dissolved by carrying out the above-described fining treatment under a relatively severe condition, thus decreasing the durability of the catalyst for fuel cells. From the comparison between Reference Example 1 and Reference Example 3, it is clear that the durability of a general catalyst for fuel cells having a core-shell structure is not decreased even when the above-described fining treatment is carried out in a relatively mild condition, compared to the case where the fining treatment is not carried out.

REFERENCE SIGNS LIST

1. Polyelectrolyte membrane
2. Cathode catalyst layer
3. Anode catalyst layer
4, 5. Gas diffusion layer
6. Cathode electrode
7. Anode electrode
8. Membrane electrode assembly
9, 10. Separator
11, 12. Gas channel
21, 41. Carbon particles
31. Reaction container
32. Magnetic stirrer
33. Reaction solution
34. Counter electrode
35. Compartment
36. Reference electrode
37. Palladium-containing particles supported on carbon supports
38. Stirrer chip
100. Unit cell
200. Carbon support
300. Device for covering palladium-containing particles supported on carbon supports with the outermost layer
400. Carbon aggregate
r. Particle diameter of carbon particle
l. Structure of carbon support
L. Diameter of carbon aggregate

The invention claimed is:

1. A method for producing a catalyst layer for fuel cells, the catalyst layer comprising fine catalyst particles, each of which comprises a palladium-containing core particle, a carbon support on which the palladium-containing core particle is supported, and a platinum-containing outermost layer covering the palladium-containing core particle, wherein the method comprises the ordered steps of:
preparing the carbon supports on which the palladium-containing core particles are supported;
applying a solvent to the carbon supports on which the palladium-containing core particles are supported;
freeze-drying the carbon supports on which the palladium-containing core particles are supported after the applying step;
fining, by intermittently operating a homogenizer in two second cycles, the carbon supports on which the palladium-containing core particles are supported after the freeze-drying step by stirring the carbon supports on which the palladium-containing core particles are supported until the total operation time reaches 45 minutes with cooling the carbon supports by cooling water; and
covering the fined palladium-containing particles, supported on the fined carbon supports, with the platinum-containing outermost layer after the fining step,
wherein, after the fining step, the particle size distribution of the carbon supports is an approximately normal distribution.

2. The catalyst layer production method according to claim 1, wherein, after the fining step, a mean volume diameter of the carbon supports is 1 to 20 μm.

3. The catalyst layer production method according to claim 1, wherein, after the fining step, a standard deviation a in the particle size distribution of the carbon supports is 1 to 5 μm.

4. The catalyst layer production method according to claim 1, wherein, after the fining step, a 90% diameter $x_{90}$ in the cumulative distribution on a volumetric basis of the carbon supports is 10 to 30 μm.

5. The catalyst layer production method according to claim 1, wherein, after the fining step, a mean number diameter of the carbon supports is 1 to 10 μm.

6. The catalyst layer production method according to claim 1, wherein, after the fining step, an mean area diameter of the carbon supports is 1 to 10 m.

7. The catalyst layer production method according to claim 1, wherein the outermost layer covering step comprises at least the steps of:
   covering the palladium-containing particles with a monatomic layer, and
   replacing the monatomic layer with the platinum-containing outermost layer.

8. A fuel cell comprising a unit cell that contains a membrane electrode assembly comprising a polyelectrolyte membrane, an anode electrode on one surface of the membrane, the anode electrode containing at least an anode catalyst layer, and a cathode electrode on the other surface of the membrane, the cathode electrode containing at least a cathode catalyst layer,
   wherein at least one of the anode and cathode catalyst layers is the catalyst layer for fuel cells produced by the production method defined by claim 1.

9. The catalyst layer production method according to claim 1, wherein, after the outermost layer covering step, a catalytic ink is dispersed by a milder condition than a condition of fining the carbon supports in the fining step.

10. A method for producing an electrode for fuel cells, wherein the electrode comprises the catalyst layer for fuel cells produced by the production method defined by claim 1.

11. The method of claim 1, further comprising a pretreatment step of applying a potential to the palladium-containing core particles after the fining step, wherein the potential applied in the pretreatment step is less than a standard electrode potential of the palladium.

12. The catalyst production method according to claim 1, wherein, after the fining step, a median diameter $x_{50}$ in the cumulative distribution on a volumetric basis of the carbon supports is 1 to 20 μm.

13. The catalyst production method according to claim 1, wherein, in the preparation step, the median diameter $x_{50}$ in the cumulative distribution on a volumetric basis of the carbon supports is more than 20 μm.

14. The catalyst production method according to claim 1, wherein the method further comprises a step of washing the fined carbon supports on which the palladium-containing core particles are supported after the fining step.

15. The catalyst production method according to claim 14, wherein the method further comprises a step of drying the fined carbon supports on which the palladium-containing core particles are supported after the washing step.

16. The catalyst production method according to claim 14, wherein the method further comprises a step of removing oxides from surface of the palladium-containing core particles after the washing step.

17. A method for producing a catalyst layer for fuel cells, the catalyst layer comprising fine catalyst particles, each of which comprises a palladium-containing core particle, a carbon support on which the palladium-containing core particle is supported, and a platinum-containing outermost layer covering the palladium-containing core particle, wherein the method comprises the ordered steps of:
   preparing the carbon supports on which the palladium-containing core particles are supported;
   applying a solvent to the carbon supports on which the palladium-containing core particles are supported;
   freeze-drying the carbon supports on which the palladium-containing core particles are supported after the applying step;
   fining, by intermittently operating a homogenizer in two second cycles, the carbon supports on which the palladium-containing core particles are supported after the freeze-drying step by stirring the carbon supports on which the palladium-containing core particles are supported until the total operation time reaches 15 minutes with cooling the carbon supports by cooling water at about 6° Celsius; and
   covering the fined palladium-containing particles, supported on the fined carbon supports, with the platinum-containing outermost layer after the fining step,
   wherein, after the fining step, the particle size distribution of the carbon supports is an approximately normal distribution and a peak of the particle size distribution is about 10 μm.

* * * * *